United States Patent [19]

Sliney

[11] Patent Number: 4,728,448

[45] Date of Patent: Mar. 1, 1988

[54] CARBIDE/FLUORIDE/SILVER SELF-LUBRICATING COMPOSITE

[75] Inventor: Harold E. Sliney, Parma, Ohio

[73] Assignee: The United States of America as represented by the Administrator of the National Aeronautics and Space Administration, Washington, D.C.

[21] Appl. No.: 54,983

[22] Filed: May 28, 1987

Related U.S. Application Data

[63] Continuation-in-part of Ser. No. 859,688, May 5, 1986, abandoned.

[51] Int. Cl.[4] .............................................. F16C 33/12
[52] U.S. Cl. ................................. 252/12.2; 252/12; 252/26; 75/228; 75/231; 427/295; 428/469; 428/545
[58] Field of Search .................... 252/12, 12.2, 26; 75/228, 231; 427/295; 428/469, 545

[56] References Cited

U.S. PATENT DOCUMENTS

| | | | |
|---|---|---|---|
| 3,199,934 | 8/1965 | Van Wyk | 308/199 |
| 3,242,076 | 3/1966 | Hagen | 252/26 |
| 3,409,549 | 11/1968 | Freeman | 252/12 |
| 3,419,363 | 12/1968 | Sliney | 29/182.1 |
| 3,508,955 | 4/1970 | Sliney | 117/119 |
| 3,677,879 | 7/1972 | D'Andrea | 161/170 |
| 3,711,171 | 1/1973 | Orkin et al. | 308/241 |
| 3,775,318 | 11/1973 | Lavik et al. | 252/12 |
| 3,941,903 | 3/1976 | Tucker | 427/190 |
| 3,953,343 | 4/1976 | Sliney | 252/12 |
| 3,954,479 | 5/1976 | Jahn | 106/52 |
| 4,110,260 | 8/1978 | Yamamoto et al. | 252/519 |
| 4,256,489 | 3/1981 | Van Wyk | 252/12 |
| 4,277,537 | 7/1981 | Woodman | 428/409 |

*Primary Examiner*—Jacqueline V. Howard
*Attorney, Agent, or Firm*—Gene E. Shook; John R. Manning

[57] ABSTRACT

A self-lubricating, friction and wear reducing composite material for use over a wide temperature spectrum from cryogenic temperature to about 900° C. in a chemically reactive environment comprising silver, barium fluoride/calcium fluoride eutectic, and metal bonded chromium carbide.

11 Claims, 2 Drawing Figures

CARBIDE/FLUORIDE/SILVER SELF-LUBRICATING COMPOSITE

ORIGIN OF THE INVENTION

The invention described herein was made by an employee of the U.S. Government and may be manufactured and used by or for the Government for governmental purposes without the payment of any royalties thereon or therefor.

STATEMENT OF COPENDENCY

This application is a continuation-in-part of application Ser. No. 859,688 filed May 5, 1986, now abandoned.

TECHNICAL FIELD

This invention relates generally to composite materials. The invention is particularly directed to a self-lubricating, very wear-resistant composite material for use over a wide temperature spectrum from cryogenic temperature to about 900° C. in a chemically reactive environment.

There is a great need in current technology for durable solid lubricated systems that will perform satisfactorily for a long time duration over a wide range of temperatures. For example, the achievement of major advances in high temperature lubrication is essential for the development of more fuel efficient engines, such as the adiabatic diesel and advanced turbo machinery. Other examples are the advanced Stirling engine and numerous aerospace mechanisms. Maximum temperatures of 600° to 1100° C. are anticipated for critical sliding contacts in these applications. Certain hard carbides, of which chromium carbide is a preferred example, have the necessary combination of wear resistance and oxidation resistance, but unacceptably high friction coefficients for many applications.

An approach to combining low wear and low friction is via composites of wear-resistant carbides with solid lubricants. Solid lubricant candidate materials that are thermally and chemically stable (nonreactive) at the temperatures cited include certain soft oxides, vitreous glazes, fluorides of alkaline earth metals, and soft noble metals such as gold and silver. Although gold and silver are of course costly, the amount used is often small enough to make the use of those metals cost effective in specialty lubricants.

Silver, in particular, is well known to be an important tribological material for a wide range of applications. For example, it has been used for many years as an electroplated coating on the retainer of rolling element bearings; steel-backed electroplated silver bearings have been used as hydrodynamically-lubricated crank shaft and main bearings in high performance reciprocating engines for aircraft.

Silver, when used as a thin film between hard sliding surfaces, can function as a solid lubricant film because it is extremely ductile. This extreme ductility allows the silver film to plastically shear between the sliding surfaces and thereby provide a lubricating function.

A problem with thin electroplated silver is the difficulty in maintaining adequate bonding to the substrate at elevated temperatures in an oxidizing environment. Further, if the silver is too thick, it will deform excessively under the normal load thus destroying dimensional accuracy and adding a significant plowing force to the total frictional (tangential) force.

Further it has been known for some time that thermally-fused (or fusion-bonded) coatings of a chemically stable fluoride, such as calcium fluoride ($CaF_2$) and barium fluoride ($BaF_2$), provide effective lubrication of nickel-base superalloys from about 500° C. to 900° C. Plasma sprayed, ceramic based coating compositions have also been developed for high temperature applications. The disadvantage of these fluorides is that they are not effective at low temperatures. Metal fluoride composites produced by metallurgical techniques and by plasma spraying have similar lubrication/temperature characteristics.

It is therefore, the objective of the invention to provide a composite material for improved low temperature lubrication while retaining good high temperature lubrication.

Another object of the invention is to provide a hard, very wear resistant coating with wide temperature spectrum capabilities.

Still another object of the invention is to provide a material with excellent combination of wear resistant and superior stable oxidation resistance.

Yet another object of the invention is to provide a new composite coating for self-lubricating bearing application.

Another object of the invention is to provide a protective coating surface to a bearing that would not appreciably wear over a long life.

BACKGROUND ART

U.S. Pat. No. 3,419,363 to Sliney relates to a self-lubricating bearing and sealing material for use in a chemically reactive environment. The materials are used at temperatures above 1000° F. in air, hydrogen and liquid alkali metals.

U.S. Pat. No. 3,954,479 to Jahn relates to a high temperature and wear-resistant antifriction material having low thermal expansion. This material contains glass or glass ceramics, and an antifriction oxide of nickel oxide, cobalt oxide, iron oxide, bismuth oxide or chromic oxide.

U.S. Pat. No. 3,953,343 to Sliney is directed to a composite material having low friction surfaces, is self lubricating and oxidation resistant. This material is comprised of a fluoride salt, a glass component and a metal component.

U.S. Pat. No. 3,508,955 to Sliney is directed to a method for making self-lubricating fluoride-metal composite materials useful at temperatures above 1000° F. in air, hydrogen and liquid alkali metals.

DISCLOSURE OF THE INVENTION

According to the present invention a chromium carbide with a suitable binder such as nickel aluminum or nickel chromium alloy is interspersed with silver and a calcium fluoride/barium fluoride eutectic. The resulting composite material exhibits self-lubricating, wear and friction reducing properties over a broad temperature spectrum from cyrogenic temperatues to 900° C. in a chemically reactive environment. The materials were prepared by co-deposition of powdered components by plasma spray. The coating was deposited on a commercially known Inconel 750 substrate.

The objects of the invention are achieved with this nickel alloy bonded chromium carbide wear control coating composition which was modified by the addition of silver and $CaF_2/BaF_2$ eutectic. The resulting material may be used in applications covering a wide temperature range.

BRIEF DESCRIPTION OF THE DRAWINGS

The foregoing as well as other objects, features and advantages of this invention will become more apparent from the following detailed description when taken in conjunction with the appended figures in which.

BEST MODE FOR CARRYING OUT THE INVENTION

Figure 1:
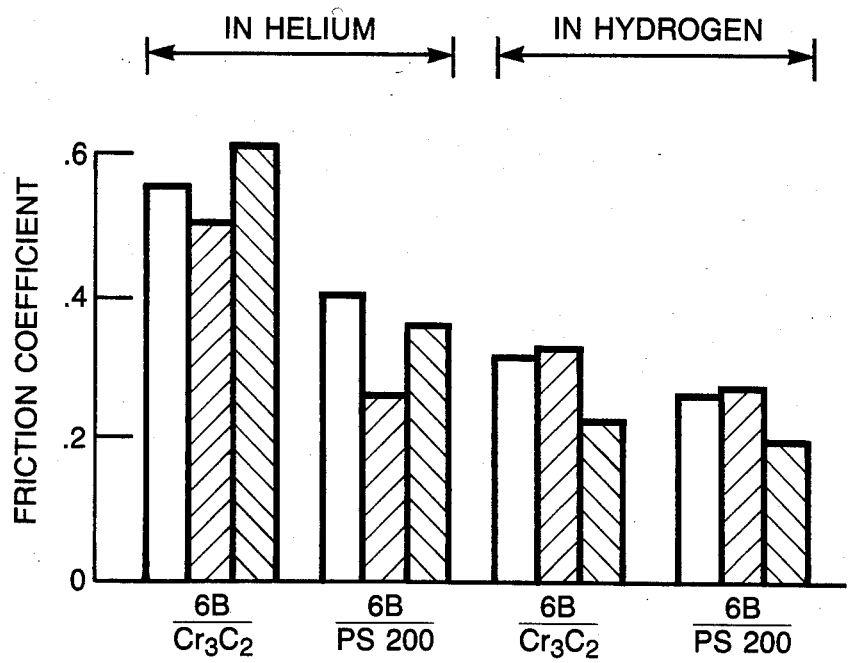
FIG. 1 is a graph showing the friction coefficients of the subject invention in helium and hydrogen environments.

Commercially available powders, as shown in Table I, specifically prepared for plasma spraying were blended in accordance with the present invention. More particularly, the material was prepared by co-depositing the powdered component by plasma spraying in a manner described in U.S. Pat. No. 3,953,343. The substrate material was a nickel-base superalloy known commercially as Inconel 750 precipitation hardened to $R_C35$. The Inconel 750, a good substrate material, was first sandblasted, then plasma sprayed with a nichrome bond coat about 0.007 cm thick, and finally with the lubricant coating to a total coating thickness of about 0.050 cm. The coating was then surface ground by either diamond grinding or with grinding wheels of cubic boron nitride to a total coating thickness of 0.025 cm, and a surface finish of about 0.2 $\mu$m. Composite coatings formulated in this manner exhibited excellent self-lubricating characteristics over repeated temperature cycles from low temperature (25° C.) to about 900° C. as will be more fully set forth below.

TABLE I

| MATERIALS USED IN PREPARATION OF PLASMA-SPRAYED COATINGS | | |
|---|---|---|
| Powder material | Range of particle sizes, $\mu$m | Source |
| Silver (Ag) | 50 to 150 | Commercial, plasma spray powder |
| Nichrome (NiCr) 80 Ni-20 Cr | 50 to 150 | Commercial, plasma spray powder |
| Calcium fluoride ($CaF_2$) | 5 to 20 | Reagent grade chemical |
| Chromium Carbide Nickel Aluminum Blend | 10 to 70 | Commercial plasma Spray powder |

The present invention is a composite material comprising a first component of metal bonded carbide, a second component comprising a soft noble metal, and a third component comprising a group I or group II fluoride eutectic.

The metal bonded carbide component comprises a superalloy, preferably a nickel based superalloy, between about 20-40 percent of the component interspersed with a carbide to form a hard carbide. Other superalloys, however, may be used such as cobalt based and mixtures of nickel and cobalt based superalloys. Furthermore, carbides of chromium, hafnium and mixtures therof may be used, although chromium carbide is preferable.

Chromium carbide is more oxidatively stable than, for example, the well known wear resistant hard materials such as tungsten carbide and titanium carbide or nitride. $Cr_3C_2$ not only has excellent wear resistance and thermal stability, but exhibits high friction coefficient when used in sliding contacts. By blending solid lubricants with $Cr_3C_2$, friction characteristics are improved. Accordingly, chromium carbide was selected for its excellent combination of wear resistance and superior oxidation resistance.

Turning now to the soft noble metal component, it is added to the bonded $Cr_3C_2$ to form an alloy matrix containing high temperature lubricants in order to improve low temperature tribological properties. In the preferred embodiment, silver is used in the alloy matrix. When used as a thin film between hard sliding surfaces, silver functions as a lubricant because of its very marked ductility. However, at elevated temperatures in an oxidizing environment, silver exhibits difficulty in maintaining bonding to a substrate. Accordingly, by using silver as an additive in a ternary composite material, effective lubricant properties were exhibited for use from low temperatures to about 900° C. in an oxidizing atmosphere (air).

Turning now to the group I or group II fluorides component, thermally fused and plasma sprayed coatings of chemically stable metal fluoride mixtures, such as calcium fluoride and barium fluoride, exhibit effective lubrication of nickel based superalloys from about 500° to 900° C. Further, these metal fluoride mixtures are not effective lubricants at lower temperatures. Accordingly, the novel composite material of this invention is formulated by combining the good elevated temperature wear and friction properties of the fluorides, with the low temperature wear and friction properties of silver.

Further, in regards to the silver and eutectic, these components act synergistically to improve the lubrication properties of the coating. Having only one of the two components in the coating does not prevent abrasive wear of the coating and counterface material. Also, each lubricant alone can only lubricate over a relatively narrow temperature range. When both lubricants are present in the coating, the temperature range in which the system can lubricate widens to include the overlapping temperature ranges of both the silver and the eutectic.

Having thus described the individual components of the topic self-lubricating, wear and friction reducing composite material, it will be appreciated that each of the metal fluoride and bonded chromium carbide components may be present in varying amounts. For example, Table II summarizes coatings with various percent composition of the subject components.

TABLE II

| COMPOSITION AND IDENTIFICATION NUMBER OF COATINGS EVALUATED | | | |
|---|---|---|---|
| | Composition Wt % | | |
| Identification number | Bonded $Cr_3C_2$ | Silver | Eutectic |
| PS200 | 80 | 10 | 10 |
| PS203 | 85 | 5 | 10 |
| PS204 | 85 | 10 | 5 |
| PS212 | 70 | 15 | 15 |
| PS213 | 60 | 20 | 20 |
| PS215 | 70 | 30 | 0 |
| PS216 | 70 | 0 | 30 |
| PS218 | 100 | 0 | 0 |

Figure 2:
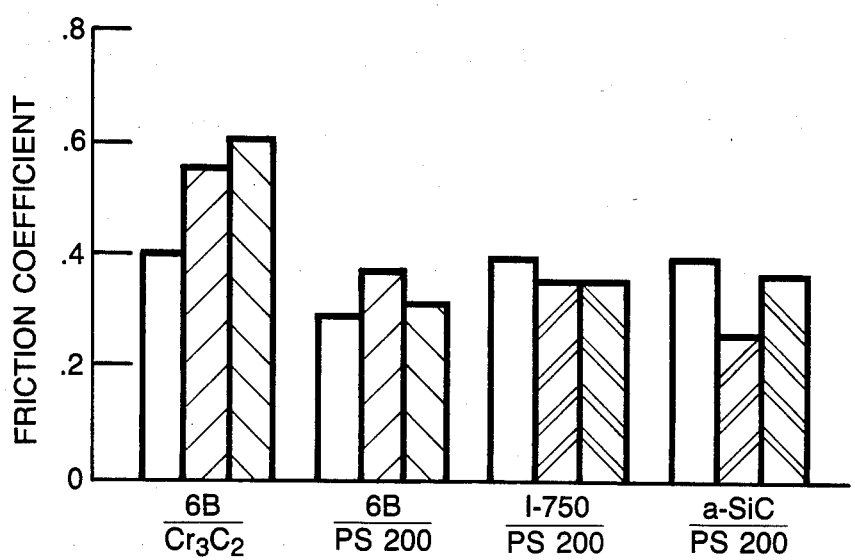
FIG. 2 is a graph showing the friction coefficient of the subject invention in air.

On the one hand, the metal-bonded Cr₃C₂ formulation with no added lubricants (PS218) provided adequate wear resistance, but the coating wear factors were higher than with the formulated coatings. Although very useful for wear control, in many applications chromium carbide coatings are not sufficiently self-lubricating without solid lubricant additives. Still further, coatings designated as PS203 and PS204 contain a total of 15 wt. % silver and fluorides. The friction coefficients were relatively high, about 0.5 for both compositions. On the other hand, friction coefficients for PS200 were typically 0.25 to 0.35 in helium and somewhat lower in hydrogen as shown in FIGS. 1 and 2 respectively. Wear factors were also lower than those of the previous coatings. Two other compositions with 1:1 ratios of the additives but in higher percentages were also formulated. PS212 contains 15 wt. % of each of the additives and PS213 contains 20 wt. % of each. Accordingly, therefore, a total solid lubricant content of about 20 to 40 weight percent in a 1:1 ratio of the two solid lubricant additives appear to be an optimum composition range for this coating system.

Further, in regards to tribometry, friction and wear experiments were run on a standard pin-on-disk apparatus in which a pin with a hemispherical radius of 0.48 cm is placed in sliding contact with the flat, coated surface of a rotating disk. Normal load is applied by dead weights and friction force is continuously measured with a temperature-compensated strain gauge bridge circuit.

Accordingly, in view of the foregoing, self-lubricating wear and friction reducing composite materials may be comprised of from 10 to 20 wt. % each of the additives silver and group II fluorides; and, from 60 to 80 wt. % metal-bonded chromium carbide.

A preferred composite according to the present invention is comprised of 10 wt. % silver, 10 wt. % CaF₂/BaF₂ eutectic and 80 wt. % nickel-bonded chromium carbide. Friction and wear data for this composite is shown in Table III for a range of temperatures from 25° to 900° C.

TABLE III

FRICTION AND WEAR DATA FOR PS200 (80 PERCENT BONDED CHROMIUM CARBIDE-10 PERCENT Ag-10 PERCENT BaF₂/CaF₂ EUTECTIC) [0.8 m/s (300 rpm, 5 cm diam track), 0.5 kg, 20 min test duration.]

| Materials | | Temperature, °C. | Wear factors, K (run-in wear), cm₃/cm kg | | Typical friction coefficients |
|---|---|---|---|---|---|
| Pin | Disk | | Pin | Coating | |
| Inc. 750 | PS200 | 75 | $2 \times 10^{-9}$ | Non-detectable | 0.40 ± 0.05 |
| | | 760 | $3.5 \times 10^{-9}$ | Non-detectable | 0.35 ± 0.05 |
| | | 900 | $1.5 \times 10^{-9}$ | $5.1 \times 10^{-9}$ | 0.35 ± 0.05 |
| SiC | PS200 | 25 | $1.2 \times 10^{-11}$ | Non-detectable | 0.40 ± 0.05 |
| | | 760 | $1.0 \times 10^{-10}$ | | 0.26 ± 0.05 |
| | | 900 | $6.0 \times 10^{-11}$ | | 0.35 ± 0.05 |
| HS6B | Unformulated Bonded Chrome Carbide | 25 | $2.9 \times 10^{-9}$ | | 0.55 ± 0.05 |
| | | 530 | $7.5 \times 10^{-10}$ | | 0.45 ± 0.05 |

While the invention has been described with reference to certain perferred embodiments thereof, those skilled in the art will appreciate that various modification, changes, omissions and substitutions may be made without departing from the spirit of the invention. It is intended, therefore, that the invention be limited only by the scope of the following:

I claim:
1. A self-lubricating, friction and wear reducing composite material for use over a wide temperature spectrum from cryogenic temperature to about 900° C. in a chemically reactive environment, consisting essentially of:
   (a) a first component comprising between about 60-80 percent by weight metal-bonded chromium carbide;
   (b) a second component comprising between about 10-20 percent by weight soft noble metal; and,
   (c) a third component comprising between about 10-20 percent by weight metal fluoride mixture.
2. A self-lubricating, wear control composite as claimed in claim 1 wherein said first component includes a metal binder selected from the group consisting of:
   (a) nickel based superalloys;
   (b) cobalt based superalloys; and,
   (c) mixtures thereof.
3. A self lubricating, friction and wear reducing composite material as claimed in claim 2 wherein the metal binder is between 20-40 percent by weight of said first component.
4. A self-lubricating, wear control composite material as claimed in claim 1 wherein said third component is selected from the group consisting of the fluorides of:
   (a) group I metals;
   (b) group II metals;
   (c) rare earth metals; and,
   (d) mixtures thereof.
5. A self-lubricating, wear control composite material as claimed in claim 1 wherein said second component and said third component are present in the ratio of about 1:1 by weight.
6. A self-lubricating, wear control composite material as claimed in claim 5 wherein said composite is in the form of a coating bonded to a substrate.
7. A self-lubricating, wear control composite material as claimed in claim 6 applied by a plasma spray deposition process to form an adherent and coherent coating on a metal or ceramic substrate.
8. A composite material as claimed in claim 7 prepared by powdered metallurgy techniques selected from
   (a) hot pressure (HP) processing; and,
   (b) hot isotatic pressing (HIP) processing.

9. A self-lubricating, wear control composite material as claimed in claim 1 wherein the composite has a coefficient of friction in the range of about 0.10 to about 0.30.

10. In a self-lubricating, wear control composite material of the type wherein fluorides of metals selected from group I or II of the periodic table are interspersed throughout an alloy matrix, the improvement comprising (a) hard carbides, and,
(b) a metallic alloy matrix containing dispersed fluoride solid lubricants.

11. A self-lubricating, wear control composite material as claimed in claim 10, wherein the hard carbides comprise carbides of:
(a) chromium;
(b) hafnium; and
(c) mixtures thereof.

* * * * *